(12) United States Patent
Nagahara

(10) Patent No.: US 11,567,294 B2
(45) Date of Patent: Jan. 31, 2023

(54) IMAGING LENS AND IMAGING APPARATUS

(71) Applicant: FUJIFILM Corporation, Tokyo (JP)

(72) Inventor: Akiko Nagahara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 287 days.

(21) Appl. No.: 17/097,028

(22) Filed: Nov. 13, 2020

(65) Prior Publication Data

US 2021/0165187 A1     Jun. 3, 2021

(30) Foreign Application Priority Data

Nov. 29, 2019   (JP) .............................. JP2019-217522

(51) Int. Cl.

| G02B 9/04 | (2006.01) |
|---|---|
| G02B 13/18 | (2006.01) |
| G02B 3/02 | (2006.01) |
| G02B 27/00 | (2006.01) |
| G02B 13/00 | (2006.01) |
| G02B 5/00 | (2006.01) |
| G02B 9/60 | (2006.01) |
| G02B 3/04 | (2006.01) |
| G02B 9/10 | (2006.01) |

(52) U.S. Cl.
CPC ............... *G02B 9/04* (2013.01); *G02B 13/18* (2013.01); *G02B 3/02* (2013.01); *G02B 3/04* (2013.01); *G02B 5/005* (2013.01); *G02B 9/10* (2013.01); *G02B 9/60* (2013.01); *G02B 13/002* (2013.01); *G02B 13/0045* (2013.01); *G02B 27/0025* (2013.01)

(58) Field of Classification Search
CPC . G02B 9/04; G02B 13/18; G02B 9/60; G02B 9/10; G02B 3/02; G02B 3/04; G02B 5/005; G02B 13/002; G02B 13/0045; G02B 27/0025
USPC ................ 359/717, 740, 748, 793, 794, 795
See application file for complete search history.

(56) References Cited

U.S. PATENT DOCUMENTS

| 5,299,065 A | 3/1994 | Watanabe |
| 5,477,388 A * | 12/1995 | Ishiyama ............. G02B 15/142 |
| | | 359/740 |
| 6,301,063 B1 * | 10/2001 | Mori ........................ G02B 9/60 |
| | | 359/764 |

(Continued)

FOREIGN PATENT DOCUMENTS

| CN | 112105980 A * | 12/2020 | ......... G02B 27/0025 |
| CN | 111344617 B * | 8/2022 | ............ G02B 13/04 |

(Continued)

*Primary Examiner* — Evelyn A Lester

(74) *Attorney, Agent, or Firm* — Studebaker & Brackett PC

(57) ABSTRACT

An imaging lens consists of a front group and a rear group in order from the object side to the image side. The front group includes, as lenses, in order from the object side to the image side, only a positive meniscus lens having a surface convex toward the object side, a first cemented lens having a negative power as a whole, and a second cemented lens having a positive power as a whole. In the first cemented lens, a positive lens and a negative lens are cemented in order from the object side, with a surface convex toward the object side and a surface concave toward the image side. The rear group includes a negative most image side lens having a surface concave toward the object side at a position closest to the image side.

14 Claims, 10 Drawing Sheets

EXAMPLE 1

(56) References Cited

U.S. PATENT DOCUMENTS

| | | | | |
|---|---|---|---|---|
| 7,046,450 B2* | 5/2006 | Hirata | | G02B 21/33 359/755 |
| 7,663,816 B2* | 2/2010 | Sato | | G02B 13/04 359/793 |
| 7,889,444 B2* | 2/2011 | Park | | G02B 9/12 359/784 |
| 8,194,329 B2* | 6/2012 | Toyama | | G02B 15/1425 359/740 |
| 8,547,651 B2* | 10/2013 | Kubota | | G02B 9/64 359/793 |
| 8,810,931 B2* | 8/2014 | Sunaga | | G02B 13/06 359/748 |
| 8,982,484 B2* | 3/2015 | Morooka | | G02B 9/08 359/793 |
| 9,329,362 B2* | 5/2016 | Suzuki | | G02B 13/006 |
| 9,703,080 B2* | 7/2017 | Morooka | | G02B 13/02 |
| 11,150,385 B2* | 10/2021 | Yamashita | | G02B 9/06 |
| 2009/0059393 A1* | 3/2009 | Obama | | G02B 9/08 359/717 |
| 2009/0244724 A1* | 10/2009 | Shibata | | G02B 9/08 359/792 |
| 2011/0096416 A1* | 4/2011 | Obama | | G02B 9/06 359/793 |
| 2011/0235191 A1* | 9/2011 | Kawamura | | G02B 7/04 359/717 |
| 2011/0317282 A1* | 12/2011 | Kimura | | G02B 3/04 359/716 |
| 2012/0081791 A1* | 4/2012 | Tanaka | | G02B 13/06 359/581 |
| 2014/0063624 A1* | 3/2014 | Morooka | | G02B 13/02 359/740 |
| 2014/0071331 A1* | 3/2014 | Katou | | G02B 9/58 359/794 |
| 2014/0092271 A1* | 4/2014 | Katou | | G02B 13/18 348/222.1 |
| 2015/0268449 A1* | 9/2015 | Kurioka | | G02B 9/12 359/740 |
| 2015/0271374 A1* | 9/2015 | Sun | | G02B 13/18 359/740 |
| 2018/0196168 A1* | 7/2018 | Yamashita | | G02B 9/64 |
| 2020/0278518 A1* | 9/2020 | Yamada | | G02B 27/0025 |
| 2022/0137331 A1* | 5/2022 | Aoi | | G02B 3/04 359/754 |
| 2022/0244502 A1* | 8/2022 | Komatsubara | | G02B 9/64 |

FOREIGN PATENT DOCUMENTS

| | | | | |
|---|---|---|---|---|
| JP | H05-249371 A | 9/1993 | | |
| JP | 6270177 B2 | 1/2018 | | |
| JP | 6797774 B2 * | 12/2020 | | G02B 13/004 |

* cited by examiner

EXAMPLE 1

EXAMPLE 2

EXAMPLE 2

EXAMPLE 3

EXAMPLE 3

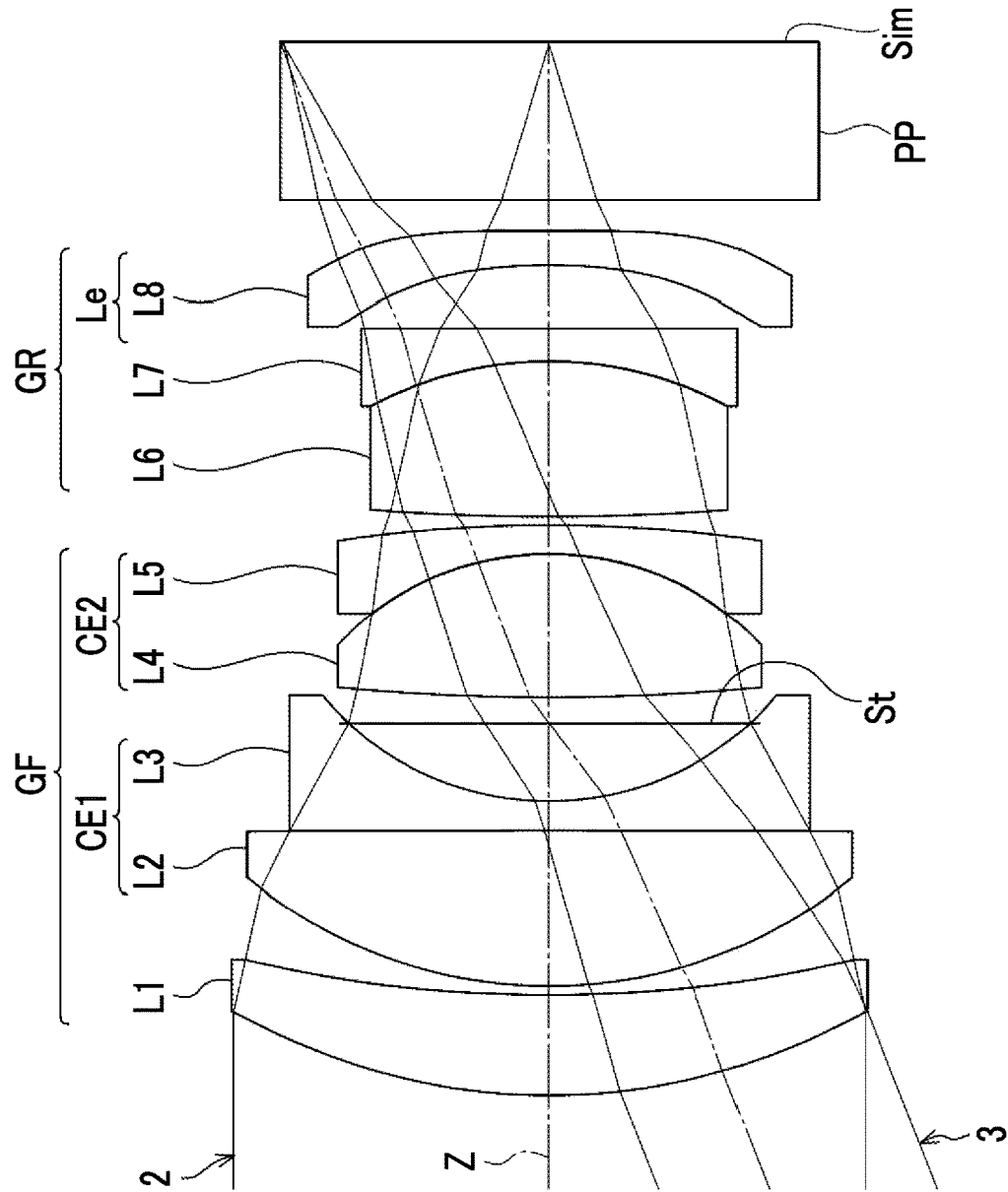

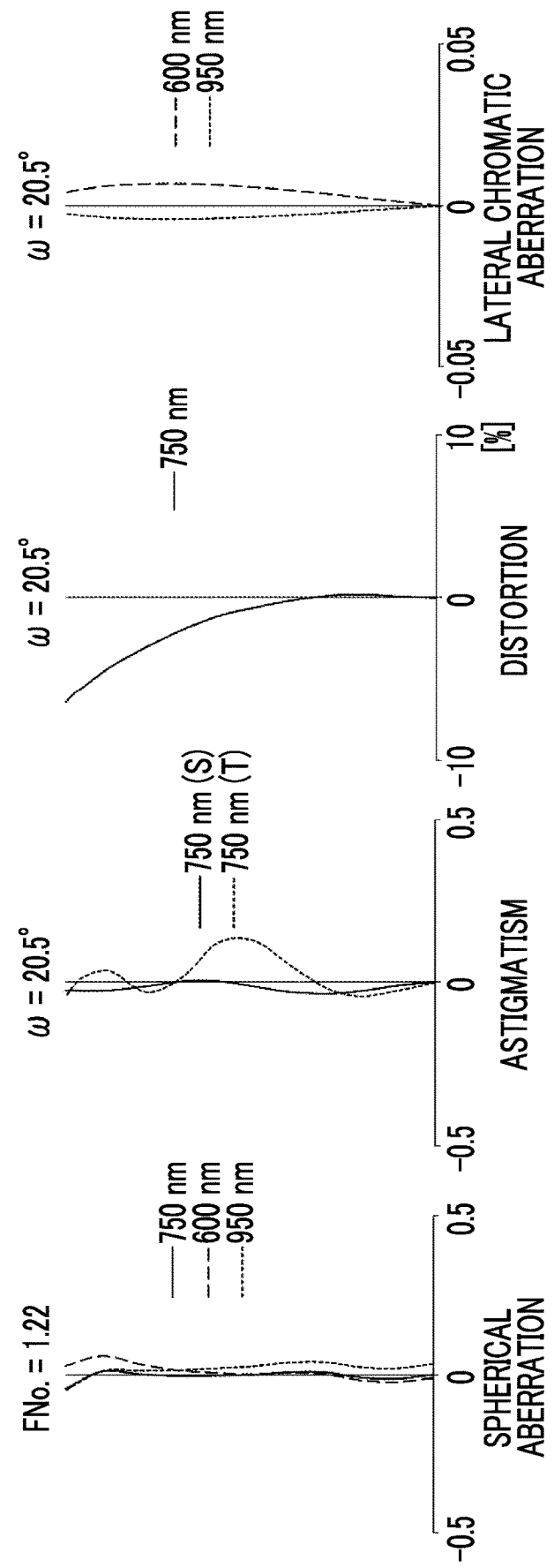

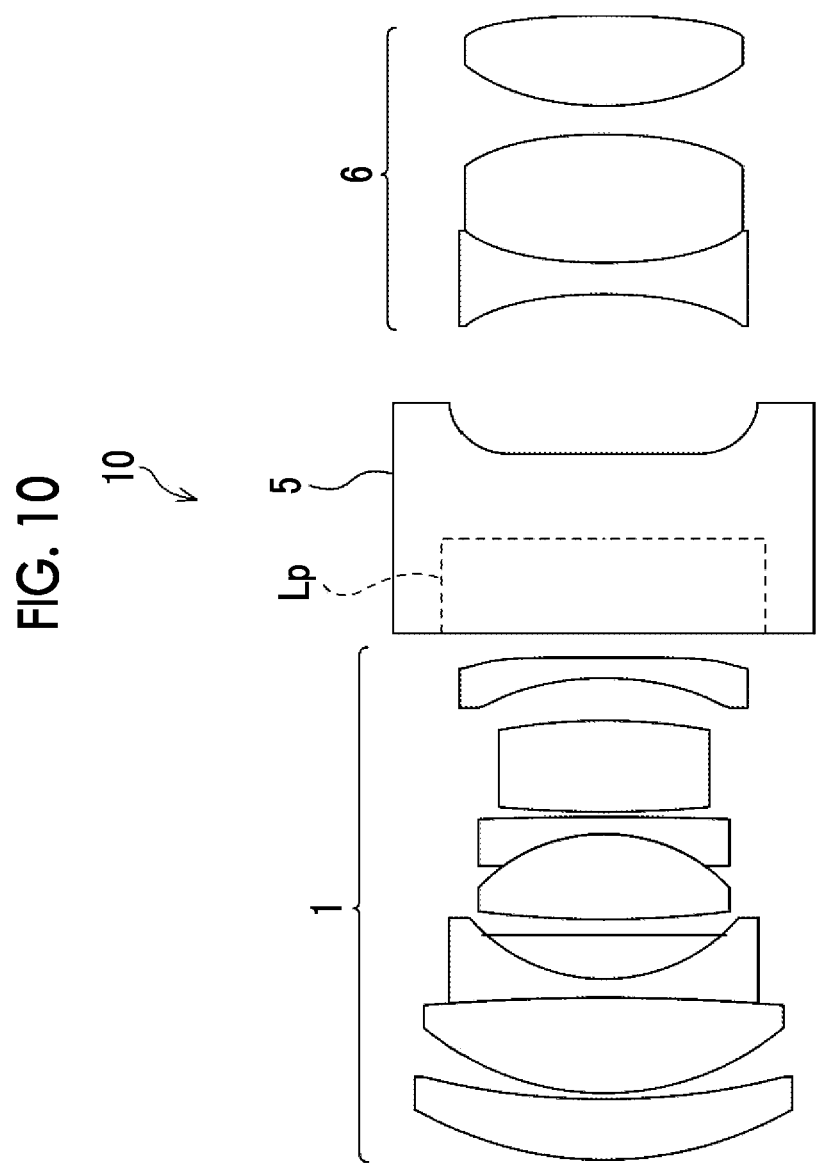

IMAGING LENS AND IMAGING APPARATUS

CROSS-REFERENCE TO RELATED APPLICATIONS

The present application claims priority under 35 U.S.C. § 119 to Japanese Patent Application No. 2019-217522, filed on Nov. 29, 2019. The above application is hereby expressly incorporated by reference, in its entirety, into the present application.

BACKGROUND OF THE INVENTION

1. Field of the Invention

The present disclosure relates to an imaging lens and an imaging apparatus.

2. Description of the Related Art

In the related art, as an imaging lens, the lens systems described in JP1993-249371A (JP-H05-249371A) and Japanese Patent No. 6270177 are known.

SUMMARY OF THE INVENTION

In recent years, there has been a demand for an imaging lens that can be made smaller while having a smaller F number.

The present disclosure has been made in view of the above circumstances, and provides an imaging lens, which can be configured to have a small F number and a small size and has excellent performance, and an imaging apparatus comprising the imaging lens.

According to an aspect of the present disclosure, there is provided an imaging lens consisting of a front group and a rear group in order from an object side to an image side, in which the front group includes, in order from the object side to the image side, as lenses, only a meniscus lens having a positive refractive power and having a convex object side surface, a first cemented lens having a convex surface closest to the object side and a concave surface closest to the image side, constituted by cementing a positive lens and a negative lens in order from the object side, and having a negative refractive power as a whole, and a second cemented lens having a positive refractive power as a whole, in which the rear group includes a most image side lens which has a negative refractive power at a position closest to the image side and has a concave object side surface, and in which assuming that a focal length of the first cemented lens at a wavelength of 750 nm is fCE1, and a focal length of the whole system at the wavelength of 750 nm is f, Conditional Expression (1) is satisfied.

$$-0.2 < f/fCE1 < 0 \tag{1}$$

It is preferable that the imaging lens of the above aspect satisfies Conditional Expression (1-1).

$$-0.12 < f/fCE1 < 0 \tag{1-1}$$

It is preferable that an image side surface of the most image side lens is a convex surface or a flat surface in the paraxial region, and is located closer to the object side than a surface on a radially inner side of an intersection point between a principal ray having an image height of 50% of the maximum image height and the image side surface on a radially outer side of the intersection point.

In the imaging lens of the above aspect, assuming that a focal length of the most image side lens at the wavelength of 750 nm is fe and a focal length of the whole system at the wavelength of 750 nm is f, it is preferable that Conditional Expression (2) is satisfied, and it is more preferable that Conditional Expression (2-1) is satisfied.

$$-2.5 < fe/f < -0.6 \tag{2}$$

$$-2 < fe/f < -0.9 \tag{2-1}$$

It is preferable that the rear group comprises a positive lens closer to the object side than the most image side lens. It is preferable that an object side surface of the positive lens of the rear group is a convex surface. It is preferable that the positive lens of the rear group of which the object side surface is a convex surface is disposed closest to the object side in the rear group, and the surface closest to the image side in the second cemented lens is a convex surface.

Assuming that a radius of curvature of the object side surface of the positive lens of the first cemented lens is R3, and a refractive index of the positive lens of the first cemented lens at the wavelength of 750 nm is n2, it is preferable that Conditional Expression (3) is satisfied, and it is more preferable that Conditional Expression (3-1) is satisfied.

$$0.1 < R3/(n2 \times f) < 0.5 \tag{3}$$

$$0.25 < R3/(n2 \times f) < 0.4 \tag{3-1}$$

Assuming that a sum of all air distances on an optical axis of the imaging lens is Dair, and a distance on the optical axis from the lens surface closest to the object side in the front group to the lens surface closest to the image side in the rear group is DL, it is preferable that Conditional Expression (4) is satisfied, and it is more preferable that Conditional Expression (4-1) is satisfied.

$$0.1 < Dair/DL < 0.4 \tag{4}$$

$$0.18 < Dair/DL < 0.3 \tag{4-1}$$

It is preferable that the number of lenses included in the imaging lens is 7 or 8.

An imaging apparatus according to another aspect of the present disclosure comprises the imaging lens according to the above aspect of the present disclosure.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the term "a lens having a positive refractive power" and the term "a positive lens" are synonymous. The term "a lens having a negative refractive power" and the term "negative lens" are synonymous. The "single lens" means one uncemented lens. Here, a compound aspheric lens (a lens in which a spherical lens and an aspherical film formed on the spherical lens are integrally formed and function as one aspheric lens as a whole) is not regarded as cemented lenses, but the compound aspheric lens is regarded as a single lens. The sign of the refractive power, the surface shape, and the radius of curvature are considered in terms of the paraxial region unless otherwise specified. Regarding the sign of the radius of curvature, the sign of the radius of curvature of the surface convex toward the object side is positive and the sign of the radius of curvature of the surface convex toward the image side is negative.

The "whole system" means an imaging lens. The "focal length" used in a conditional expression is a paraxial focal length. The "Nm" used as a unit of wavelength is nanometer. The "C line" and the "F line" described in the present specification are bright lines. In this specification, the wavelength of the C line is 656.27 nm and the wavelength of the F line is 486.13 nm.

According to the present disclosure, it is possible to provide an imaging lens, which can be configured to have a small F number and a small size and has excellent performance, and an imaging apparatus comprising the imaging lens.

BRIEF DESCRIPTION OF THE DRAWINGS

FIG. 8 is a cross-sectional view showing a configuration and rays of an imaging lens according to Example 4 of the present disclosure.

FIG. 9 is a diagram showing aberrations of the imaging lens of Example 4 of the present disclosure.

FIG. 10 is a schematic configuration diagram of an imaging apparatus according to an embodiment of the present disclosure.

DESCRIPTION OF THE PREFERRED EMBODIMENTS

Figure 1:
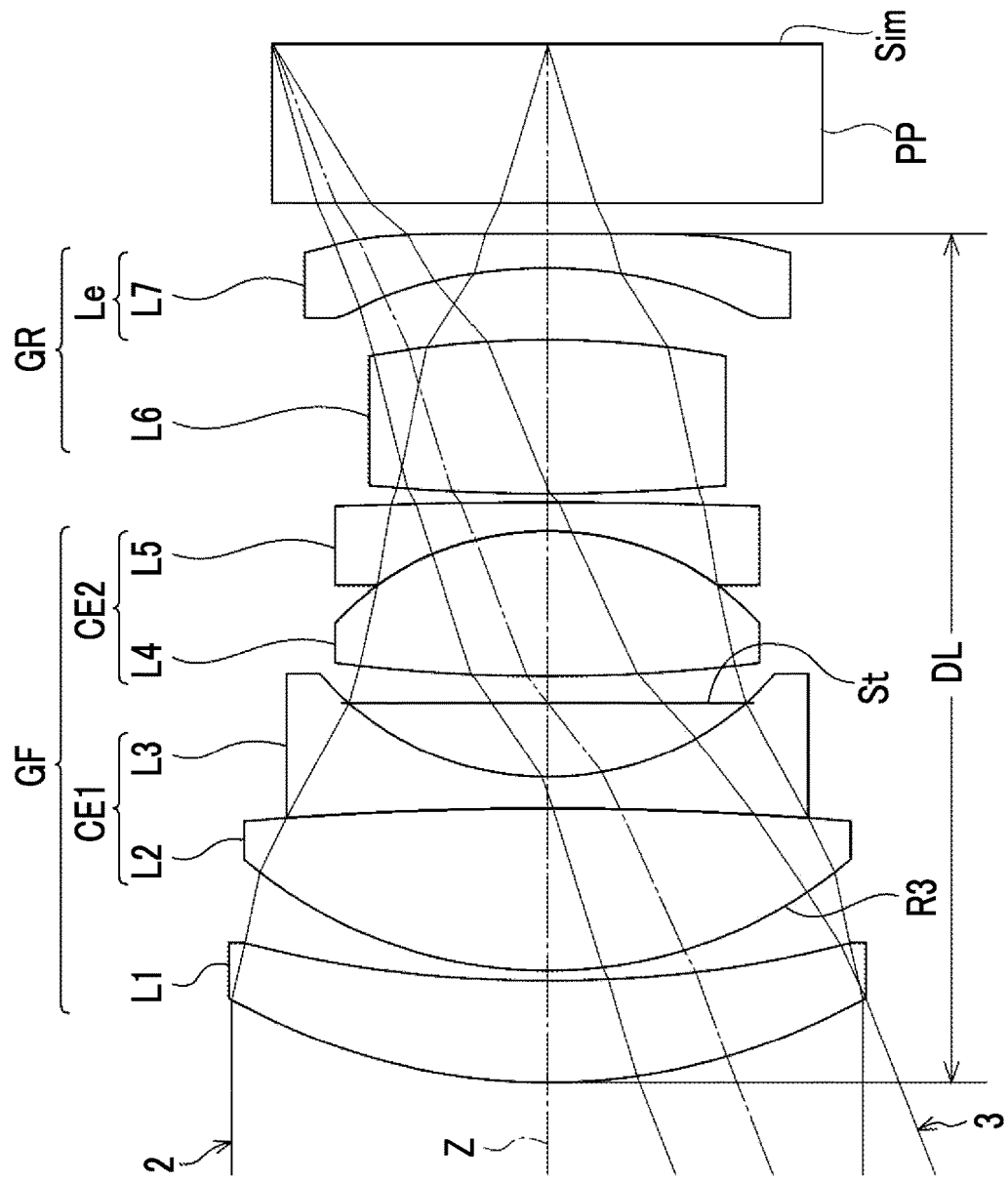
FIG. 1 is a cross-sectional view corresponding to the imaging lens of Example 1 of the present disclosure and showing a configuration and rays of an imaging lens according to an embodiment of the present disclosure.

Hereinafter, embodiments of the present disclosure will be described in detail with reference to the accompanying drawings. FIG. 1 shows a configuration of a cross section including an optical axis Z of an imaging lens according to an embodiment of the present disclosure. The example shown in FIG. 1 corresponds to the imaging lens of Example 1 to be described later. In FIG. 1, the left side is the object side, the right side is the image side, and a state in which an object at infinity is in focus is shown. FIG. 1 also shows on-axis rays 2 and rays with the maximum image height 3 as the rays.

FIG. 1 shows an example in which, assuming that an imaging lens is applied to an imaging apparatus, an optical member PP of which the incident surface and the exit surface are parallel is disposed closer to the image side than the imaging lens. The optical member PP is a member assumed to include a face plate, various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens of the present disclosure consists of a front group GF and a rear group GR in order from the object side to the image side. For example, in the example shown in FIG. 1, the front group GF consists of lenses L1 to L3, an aperture stop St, and lenses L4 to L5 in order from the object side to the image side, and the rear group GR consists of lenses L6 and L7 in order from the object side to the image side. It should be noted that the aperture stop St shown in FIG. 1 does not indicate a shape thereof, but indicates a position thereof on the optical axis.

The front group GF comprises only a meniscus lens, a first cemented lens CE1, and a second cemented lens CE2 as lenses in order from the object side to the image side. In the example of FIG. 1, the lens L1 is the meniscus lens closest to the object side, the lenses L2 and L3 are lenses composing the first cemented lens CE1, and the lenses L4 and L5 are lenses composing the second cemented lens CE2.

The meniscus lens closest to the object side in the front group GF has a positive refractive power and is configured such that the object side surface is a convex surface. By disposing the meniscus lens having the above configuration at a position closest to the object side, there is an advantage in a configuration of an optical system having a small F number while reducing the diameter of the lens closer to the image side than this lens. The meniscus lens closest to the object side may be an aspheric lens. In a case where the lens is an aspheric lens, the diameter of the lens can be reduced and the configuration of an optical system having a small F number becomes easier.

The first cemented lens CE1 is configured by cementing a positive lens and a negative lens in order from the object side, has a negative refractive power as a whole, and is configured such that the surface closest to the object side is a convex surface and the surface closest to the image side is concave. The above-described configuration of the first cemented lens CE1 facilitates reducing the diameter of the lens closer to the image side than the first cemented lens CE1, and is advantageous in correcting spherical aberration, field curvature, and chromatic aberration. In a cemented lens in which the surface closest to the object side is a convex surface and the surface closest to the image side is a concave surface, the degree of freedom of the radius of curvature of the cemented surface is increased by cementing a positive lens and a negative lens in order from the object side. Therefore, there is an advantage in correcting the aberration while keeping the diameter small. Further, by cementing the positive lens and the negative lens, the total length thereof can be shortened as compared with the case where each is composed of a single lens. Further, as will be described below, by cementing the positive lens and the negative lens, there is an advantage in downsizing the apparatus including the lens holding member. If the positive lens and the negative lens are each composed of a single lens, it is necessary to provide a holding member for contacting the two lenses between the two lenses, or it is necessary to form a shape in which the two lenses are brought into contact with each other at the peripheral portion of the lens. In the configuration in which the holding member is provided between the two lenses, the minimum diameter (hereinafter referred to as the contact diameter) of the portion where the holding member is in contact with the lens has a margin with respect to the effective diameter depending on the shape of each lens. Thus, the contact diameter is greater than the effective diameter of the lens. Since the outer diameter of the lens has to be greater than the contact diameter, as a result, in a case where each lens is composed of a single lens, the outer diameter of the lens becomes greater than a case where each lens is composed of a cemented lens. Similarly, in the configuration in which the lenses are contacted with each other in the peripheral portion of the lens, the minimum diameter of the contacting portion (hereinafter referred to as the contact diameter) must have a margin with respect to the effective diameter. Thus, the contact diameter is greater than the effective diameter of the lens. Since the outer diameter of the lens has to be greater than the contact diameter, as a result, in a case where each lens is composed of a single lens, the outer diameter of the lens becomes greater than a case where each lens is composed of a cemented lens.

The second cemented lens CE2 is configured to have a positive refractive power as a whole. The second cemented lens CE2 is advantageous in favorable correction of astigmatism and chromatic aberration. It is preferable that the second cemented lens CE2 comprises at least one positive lens and at least one negative lens. The second cemented lens CE2 may be configured by, for example, a positive lens and a negative lens cemented in order from the object side, or may be configured by a negative lens and a positive lens cemented in order from the object side.

The rear group GR comprises a most image side lens Le which has a negative refractive power at a position closest to the image side and has a concave object side surface. By disposing the most image side lens Le having the above configuration at a position closest to the image side, it becomes easy to ensure an appropriate back focal length. In the example of FIG. 1, the lens L7 is the most image side lens Le.

In the imaging lens of the present disclosure, the front group GF comprises, in order from the object side to the image side, a meniscus lens having a positive refractive power, the first cemented lens CE1 having a negative refractive power as a whole, and the second cemented lens CE2 having a positive refractive power as a whole. The rear group GR comprises the most image side lens Le which is a negative lens closest to the image side. Thereby, in a lens system having a small F number, spherical aberration is favorably corrected, while the lens closer to the image side than the first cemented lens CE1 is made smaller in diameter. There is an advantage in ensuring an appropriate back focal length.

Further, the imaging lens of the present disclosure is configured to satisfy Conditional Expression (1), where fCE1 is the focal length of the first cemented lens CE1 at the wavelength of 750 nm and f is the focal length of the whole system at the wavelength of 750 nm. Since the first cemented lens CE1 has a negative refractive power as a whole, the upper limit of Conditional Expression (1) is 0. Since the negative refractive power of the first cemented lens CE1 is prevented from becoming excessively strong by preventing the value corresponding to Conditional Expression (1) from becoming lower than or equal to the lower limit, the height of the ray of the maximum image height in the lens of the rear group GR is prevented from becoming excessively high. As a result, it is possible to suppress an increase in diameter of the lens of the rear group GR. Further, since the negative refractive power of the first cemented lens CE1 is prevented from becoming excessively strong, it is not necessary for the lens closer to the image side than the first cemented lens CE1 to have a strong positive refractive power in order to suppress an increase in diameter of the lens of the rear group GR. Thus, there is an advantage in ensuring an appropriate back focal length. In addition, in a case of a configuration in which Conditional Expression (1-1) is satisfied, it is possible to obtain more favorable characteristics.

$$-0.2 < f/fCE1 < 0 \tag{1}$$

$$-0.12 < f/fCE1 < 0 \tag{1-1}$$

Figure 2:
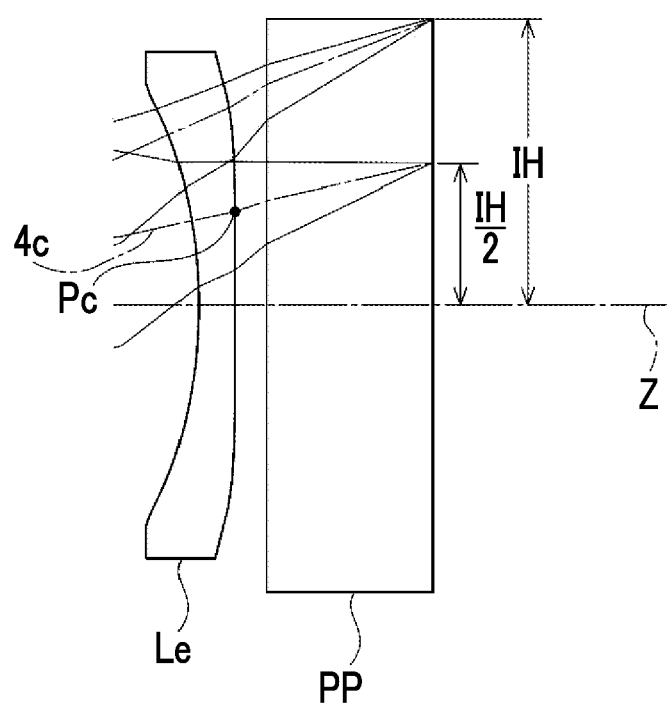
FIG. 2 is a diagram for explaining the shape of the image side surface of the most image side lens.

Next, a preferable configuration of the imaging lens will be described. It is preferable that the image side surface of the most image side lens Le is a convex surface or a flat surface in the paraxial region. In addition, it is preferable that the image side surface of the most image side lens Le is, as shown in FIG. 2, located closer to the object side than the surface on a radially inner side of an intersection point Pc, on a radially outer side of the intersection point Pc. The intersection point Pc is an intersection point between the principal ray 4c having an image height IH/2 of 50% of the maximum image height IH and the image side surface of the most image side lens Le. Here, the radially outer side of the intersection point Pc means the side farther from the optical axis Z than the intersection point Pc, and the radially inner side of the intersection point Pc means the side closer to the optical axis Z than the intersection point Pc.

In combination with the shape of the object side surface of the above-mentioned most image side lens Le, by making the image side surface of the most image side lens Le have the shape, there is an advantage in reducing the outer diameter of the most image side lens Le while ensuring an appropriate back focal length. Further, if the image side surface of the most image side lens Le is not formed into the above-described shape but, for example, the image side surface of the most image side lens Le is formed into a shape close to the optical member PP in the peripheral portion, it is necessary to ensure a distance between the most image side lens Le and the optical member PP so as not to interfere with each other. On the other hand, in a case where the image side surface is formed into the above shape, it is not necessary to ensure the distance. There is an advantage in downsizing in the optical axis direction.

It is preferable that the most image side lens Le is an aspheric lens. In a case where the lens is an aspheric lens, there is an advantage in downsizing and favorable aberration correction.

It is preferable that the rear group GR comprises a positive lens closer to the object side than most image side lens Le. The rear group GR in the example of FIG. 1 comprises a lens L6, which is a positive lens, closer to the object side than most image side lens Le. In this case, there is an advantage in reducing the outer diameter of the most image side lens Le. In a case where the rear group GR comprises a positive lens, it is preferable that the object side surface of at least one positive lens of the rear group GR is a convex surface. In this case, there is an advantage in generating a desired distortion. It is preferable that the rear group GR includes a positive lens of the rear group GR whose object side surface is a convex surface closest to the object side, and the surface closest to the image side in the second cemented lens CE2 is a convex surface. In this case, there is an advantage in reducing the diameter of the lens of the rear group GR and shortening the total length.

Assuming that the focal length of the most image side lens Le at the wavelength of 750 nm is fe and the focal length of the whole system at the wavelength of 750 nm is f, it is preferable to satisfy Conditional Expression (2). By not allowing the value corresponding to Conditional Expression (2) to be equal to or less than the lower limit, it becomes easy to ensure an appropriate back focal length. By not allowing the value corresponding to Conditional Expression (2) to be equal to or more than the upper limit, there is an advantage in suppressing the increase in outer diameter of the most image side lens Le. In addition, in a case of a configuration in which Conditional Expression (2-1) is satisfied, it is possible to obtain more favorable characteristics.

$$-2.5 < fe/f < -0.6 \quad (2)$$

$$-2 < fe/f < -0.9 \quad (2\text{-}1)$$

Assuming that the radius of curvature of the object side surface of the positive lens of the first cemented lens CE1 is R3, the refractive index of the positive lens of the first cemented lens CE1 at the wavelength of 750 nm is n2, and the focal length of the whole system at the wavelength of 750 nm is f, it is preferable that Conditional Expression (3) is satisfied. By not allowing the value corresponding to Conditional Expression (3) to be equal to or less than the lower limit, the radius of curvature of the object side surface of the positive lens of the first cemented lens CE1 is prevented from becoming excessively small. Therefore, the ray with the maximum image height on the most image side lens Le is prevented from becoming excessively high. As a result, it is possible to suppress an increase in diameter of the most image side lens Le. By not allowing the value corresponding to Conditional Expression (3) to be equal to or more than the upper limit, the radius of curvature of the object side surface of the positive lens of the first cemented lens CE1 is prevented from becoming excessively large. There is an advantage in shortening the total length. In addition, in a case of a configuration in which Conditional Expression (3-1) is satisfied, it is possible to obtain more favorable characteristics.

$$0.1 < R3/(n2 \times f) < 0.5 \quad (3)$$

$$0.25 < R3/(n2 \times f) < 0.4 \quad (3\text{-}1)$$

Assuming that the sum of all air distances on the optical axis of the imaging lens is Dair and the distance on the optical axis from the lens surface closest to the object side in the front group GF to the lens surface closest to the image side in the rear group GR is DL, it is preferable that Conditional Expression (4) is satisfied. By not allowing the value corresponding to Conditional Expression (4) to be equal to or less than the lower limit, there is an advantage in reducing the weight of the imaging lens. By not allowing the value corresponding to Conditional Expression (4) to be equal to or more than the upper limit, it becomes easy to ensure the number of lenses for aberration correction. There is an advantage in ensuring excellent optical performance. In addition, in a case of a configuration in which Conditional Expression (4-1) is satisfied, it is possible to obtain more favorable characteristics.

$$0.1 < Dair/DL < 0.4 \quad (4)$$

$$0.18 < Dair/DL < 0.3 \quad (4\text{-}1)$$

It is preferable that the number of lenses included in the imaging lens is 7 or 8. In such a case, there is an advantage in ensuring both excellent optical performance and downsizing.

The F number of the imaging lens is preferably less than 1.8, and more preferably less than 1.4. The maximum total angle of view of the imaging lens is preferably greater than 40 degrees. The corresponding wavelength range of the imaging lens can be set to 600 nm to 950 nm, for example.

The above-mentioned preferred configurations and available configurations including the configurations relating to the conditional expressions may be any combination, and it is preferable to selectively adopt the configurations in accordance with required specification.

Next, examples of the imaging lens of the present disclosure will be described. All of the data of Examples 1 to 4 shown below are for the case where the focal length of the whole system is normalized to be 20. Further, the numerical values shown in each table below are numerical values rounded off to a predetermined decimal place.

Example 1

A cross-sectional view of the configuration of the imaging lens of Example 1 is shown in FIG. 1, and the illustration method is as described above, and thus, repeated description will be partially omitted. The imaging lens of Example 1 consists of a front group GF and a rear group GR in order from the object side to the image side. The front group GF consists of lenses L1 to L3, an aperture stop St, and lenses L4 to L5 in order from the object side to the image side. The rear group GR consists of lenses L6 and L7 in order from the object side to the image side. The lens L2 and the lens L3 are cemented to form the first cemented lens CE1. The lens L4 and the lens L5 are cemented to form the second cemented lens CE2. The lens L7 is the most image side lens Le. The outline of the imaging lens of Example 1 has been described above.

Regarding the imaging lens of Example 1, Table 1 shows basic lens data, Table 2 shows specification, and Table 3 shows aspheric surface coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. The column of nA shows the refractive indexes of the components at the wavelength of 750 nm, and the column of vA shows the Abbe numbers of the components at the wavelength of 750 nm. Assuming that the refractive index at F line is nF, the refractive index at C line is nC, and the refractive index at the wavelength of 750 nm is nA, the Abbe number vA of a lens at the wavelength of 750 nm is defined by vA=(nA−1)/(nF−nC). In the column of material in Table 1, the material names of the components and the names of the manufacturing companies thereof are shown with periods interposed therebetween. The manufacturing company names are shown schematically.

In Table 1, the sign of the radius of curvature of the surface convex toward the object side is positive and the sign of the radius of curvature of the surface convex toward the image side is negative. Table 1 also shows the aperture stop St and the optical member PP. In a place of a surface number of a surface corresponding to the aperture stop St, the surface number and a term of (St) are noted. A value at the bottom place of D in Table 1 indicates a distance between the image plane Sim and the surface closest to the image side in the table.

Table 2 shows the focal length f, the back focal length Bf at the air conversion distance, and the F number FNo, and the maximum total angle of view 2ω. (°) in the place of 2w indicates that the unit thereof is a degree. The values shown in Tables 1 and 2 are values in the case of using the wavelength of 750 nm as a reference in a state where the object at infinity is in focus.

In basic lens data, the reference sign * is attached to surface numbers of aspheric surfaces, and numerical values of the paraxial radius of curvature are written into the column of the radius of curvature of the aspheric surface. In Table 3, the row of Sn shows surface numbers of the aspheric surfaces, and the rows of KA and Am shows numerical values of the aspheric surface coefficients for each aspheric surface. The "E±n" (n: an integer) in numerical values of the aspheric surface coefficients of Table 3 indicates "×10$^{±n}$". KA and Am are the aspheric surface coefficients in the aspheric surface expression represented by the following expression. m is an integer of 3 or more, and varies depending on the surface. For example, m=3, 4, 5, . . . , 17 for the surface 1 of Table 3.

$$Zd = C \times h^2 / \{1 + (1 - KA \times C^2 \times h^2)^{1/2}\} \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, KA and Am are aspheric surface coefficients, and Σ in the aspheric surface expression means the sum with respect to m.

TABLE 1

Example 1
Based on wavelength of 750 nm

| Sn | R | D | nA | vA | Material |
|---|---|---|---|---|---|
| *1 | 15.7604 | 2.7950 | 1.70504 | 53.34 | M-LAC8.HOYA |
| *2 | 34.4818 | 0.2775 | | | |
| 3 | 11.6975 | 4.4114 | 1.85830 | 40.15 | TAFD32.HOYA |
| 4 | −87.8860 | 0.8657 | 1.72594 | 27.23 | S-TIH13.OHARA |
| 5 | 7.5646 | 2.0219 | | | |
| 6(St) | ∞ | 0.7249 | | | |
| 7 | 41.7257 | 3.9336 | 1.72110 | 54.07 | S-LAL18.OHARA |
| 8 | −7.3344 | 0.7858 | 1.78771 | 24.87 | S-TIH6.OHARA |
| 9 | −141.9597 | 0.2361 | | | |
| 10 | 48.8223 | 4.1994 | 1.90008 | 23.41 | FDS24.HOYA |
| 11 | −24.5270 | 1.9573 | | | |
| *12 | −12.1696 | 0.9415 | 1.57718 | 58.85 | M-BACD12.HOYA |
| *13 | ∞ | 0.8342 | | | |
| 14 | ∞ | 4.3473 | 1.48317 | 69.78 | N-FK5.SCHOTT |
| 15 | ∞ | 0 | | | |

TABLE 2

Example 1
Based on wavelength of 750 nm

| | |
|---|---|
| f | 20.00 |
| Bf | 3.77 |
| FNo. | 1.22 |
| 2ω (°) | 41.0 |

TABLE 3

Example 1

| Sn | 1 | 2 |
|---|---|---|
| KA | 1.0000000000000.0E+00 | 1.00000000000000E+00 |
| A3 | 1.51934053632851E−20 | −1.05482521138114E−19 |
| A4 | 2.19863539150847E−04 | 2.98916652443394E−04 |
| A5 | −8.33260192383220E−05 | −9.51437130138815E−05 |
| A6 | −3.36676385744574E−06 | −1.09025196656214E−05 |
| A7 | 5.28389946498816E−06 | 7.83435823064007E−06 |
| A8 | −1.25074420634189E−07 | 2.19445490256210E−07 |

TABLE 3-continued

Example 1

| A9 | −1.80409797357194E−07 | −3.48821830423063E−07 |
|---|---|---|
| A10 | 5.88861244029052E−09 | 5.68702096587615E−10 |
| A11 | 3.79011591795602E−09 | 8.98748600647146E−09 |
| A12 | −9.08231546668008E−11 | −1.01445402503973E−10 |
| A13 | −4.95835937428879E−11 | −1.33998905344422E−10 |
| A14 | 5.48357698147804E−13 | 1.56244278886702E−12 |
| A15 | 3.74863244715390E−13 | 1.07437161641625E−12 |
| A16 | −7.01738270058696E−16 | −7.79215078620825E−15 |
| A17 | −1.26312681624346E−15 | −3.58889746685870E−15 |

| Sn | 12 | 13 |
|---|---|---|
| KA | 1.00000000000000E+00 | 1.00000000000000E+00 |
| A3 | 4.33059336642191E−19 | −6.87041636080974E−19 |
| A4 | 7.79656713505434E−04 | 9.07722002213755E−04 |
| A5 | 8.97783471078352E−05 | −1.81130627586176E−04 |
| A6 | −3.94785905187620E−04 | −3.12625213881210E−04 |
| A7 | 4.93819733659953E−06 | 5.91465476930052E−05 |
| A8 | 6.56526981672375E−05 | 4.22203140560606E−05 |
| A9 | 8.28319786511147E−07 | −7.83915779073683E−06 |
| A10 | −6.73575613059946E−06 | −3.26322501398071E−06 |
| A11 | −2.08358411239689E−07 | 5.34267757862642E−07 |
| A12 | 4.18277281986486E−07 | 1.53170228605407E−07 |
| A13 | 1.62815275357333E−08 | −2.10057773982006E−08 |
| A14 | −1.51819936205123E−08 | −4.28425968644573E−09 |
| A15 | −6.25859705443273E−10 | 4.79136223510208E−10 |
| A16 | 2.93487234850053E−10 | 6.51906853255928E−11 |
| A17 | 1.21290804345461E−11 | −5.88015694237542E−12 |
| A18 | −2.31332659312505E−12 | −4.12217161943069E−13 |
| A19 | −9.51578137229338E−14 | 2.99593826545807E−14 |

Figure 3:
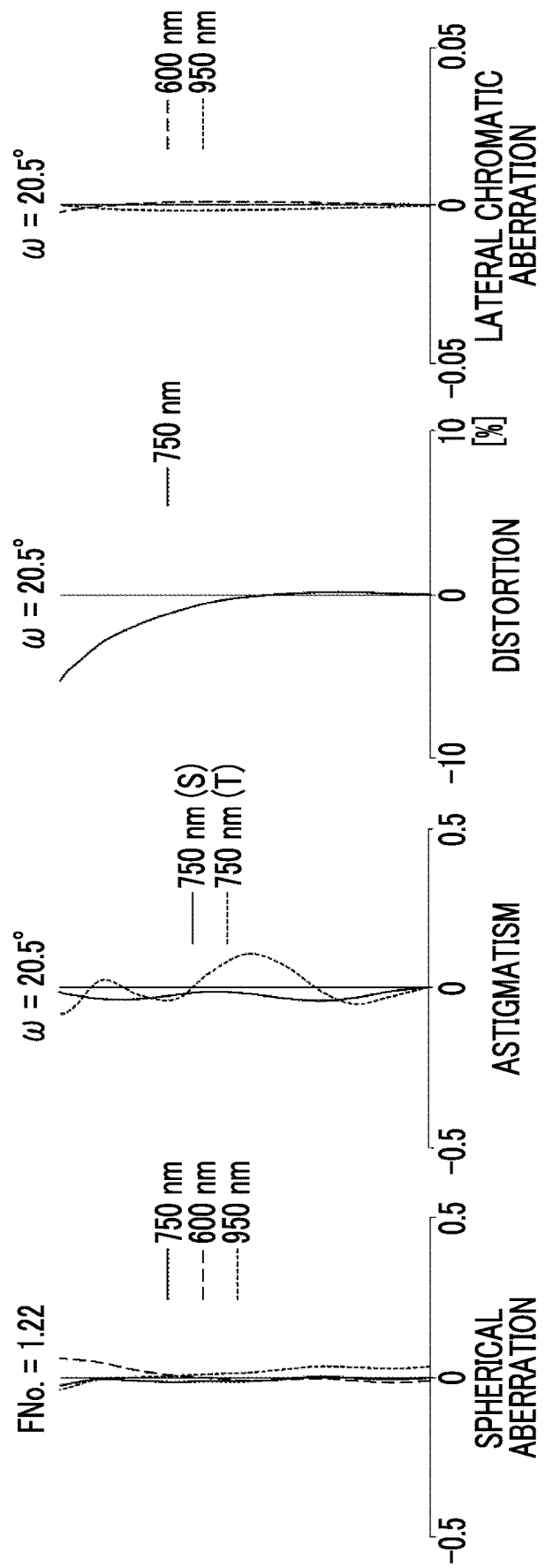
FIG. 3 is a diagram showing aberrations of the imaging lens of Example 1 of the present disclosure.

FIG. 3 shows aberration diagrams of the imaging lens of Example 1 in a state where the object at infinity is in focus. In FIG. 3, in order from the left side, spherical aberration, astigmatism, distortion, and lateral chromatic aberration are shown. In the spherical aberration diagram, aberrations at a wavelength of 750 nm, a wavelength of 600 nm, and a wavelength of 950 nm are indicated by the solid line, the long dashed line, and the short dashed line, respectively. In the astigmatism diagram, aberration in the sagittal direction at the wavelength of 750 nm is indicated by the solid line, and aberration in the tangential direction at the wavelength of 750 nm is indicated by the short dashed line. In the distortion diagram, aberration at the wavelength of 750 nm is indicated by the solid line. In the lateral chromatic aberration diagram, aberrations at a wavelength of 600 nm and a wavelength of 950 nm are indicated by the long dashed line and the short dashed line, respectively. In the spherical aberration diagram, FNo. indicates an F number. In the other aberration diagrams, w indicates a half angle of view.

Symbols, meanings, description methods, and illustration methods of the respective data pieces according to Example 1 are the same as those in the following examples unless otherwise noted. Therefore, in the following description, repeated description will be omitted.

Example 2

Figure 4:
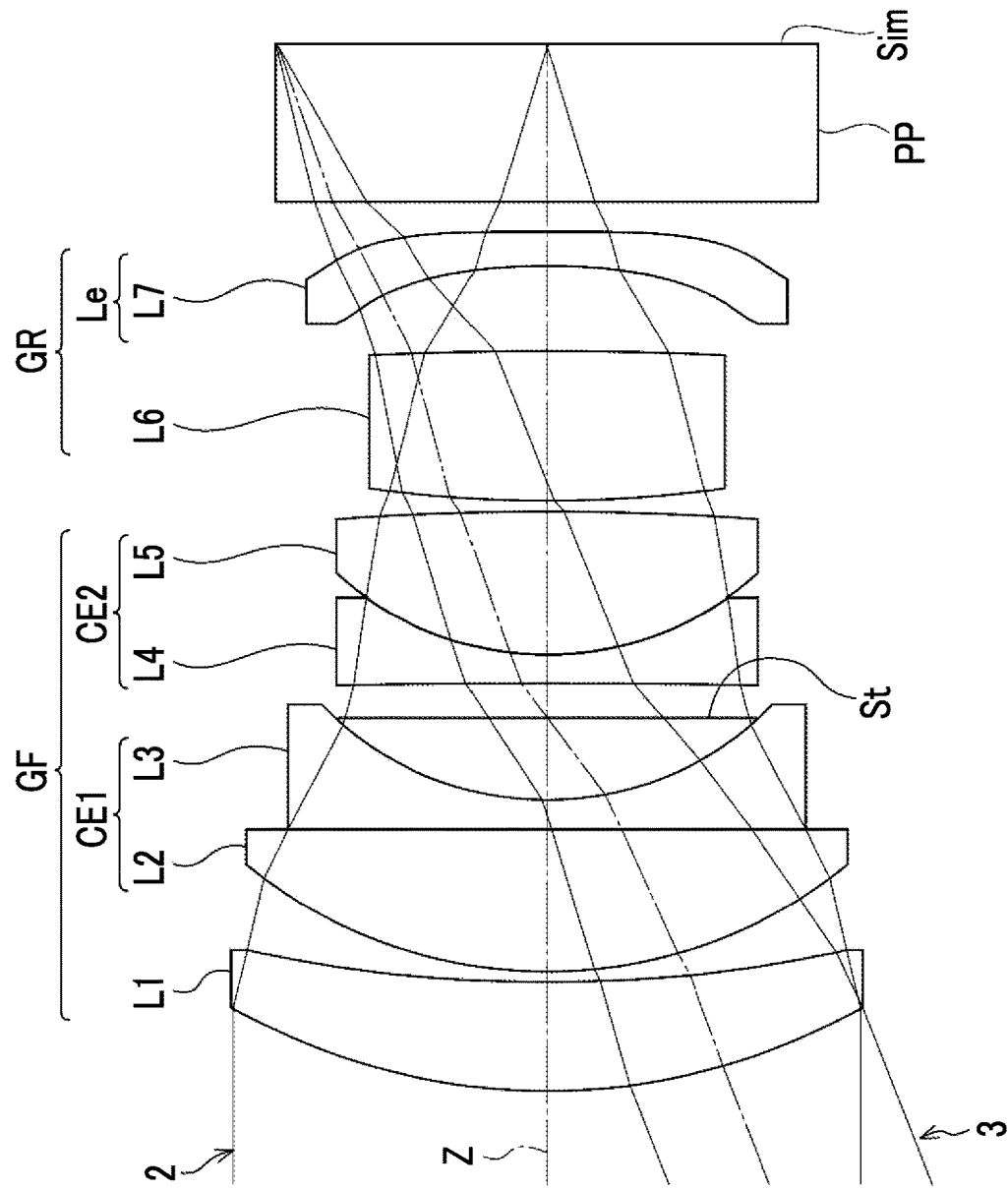
FIG. 4 is a cross-sectional view showing a configuration and rays of an imaging lens according to Example 2 of the present disclosure.
Figure 5:
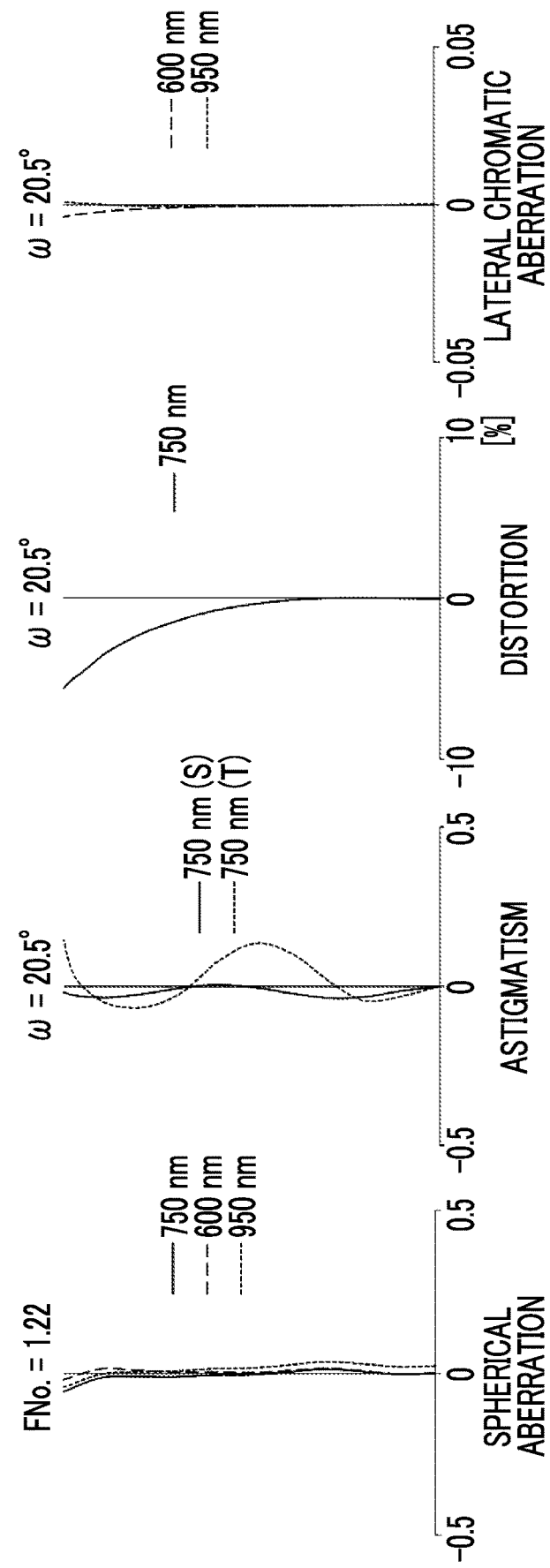
FIG. 5 is a diagram showing aberrations of the imaging lens of Example 2 of the present disclosure.

FIG. 4 is a cross-sectional view showing a configuration and rays of the imaging lens of Example 2. The imaging lens of Example 2 has the same configuration as the outline of the imaging lens of Example 1. Regarding the imaging lens of Example 2, Table 4 shows basic lens data, Table 5 shows specification, and Table 6 shows aspheric surface coefficients thereof, and FIG. 5 shows aberration diagrams.

TABLE 4

Example 2
Based on wavelength of 750 nm

| Sn | R | D | nA | νA | Material |
|---|---|---|---|---|---|
| *1 | 15.8688 | 3.0112 | 1.70504 | 53.34 | M-LAC8.HOYA |
| *2 | 40.0579 | 0.2809 | | | |
| 3 | 11.9187 | 3.9303 | 1.85830 | 40.15 | TAFD32.HOYA |
| 4 | ∞ | 0.8094 | 1.74591 | 25.96 | S-TIH14.OHARA |
| 5 | 7.9375 | 2.2566 | | | |
| 6(St) | ∞ | 0.9467 | | | |
| 7 | −279.4345 | 0.7938 | 1.73995 | 26.96 | S-TIH4.OHARA |
| 8 | 7.8809 | 3.9330 | 1.82340 | 42.16 | S-LAH55VS.OHARA |
| 9 | −70.8083 | 0.2943 | | | |
| 10 | 32.1787 | 4.1266 | 1.89607 | 34.68 | TAFD35.HOYA |
| 11 | −97.4370 | 2.3578 | | | |
| *12 | −16.6814 | 0.9437 | 1.57718 | 58.85 | M-BACD12.HOYA |
| *13 | −437.1354 | 0.8236 | | | |
| 14 | ∞ | 4.3554 | 1.48317 | 69.78 | N-FK5.SCHOTT |
| 15 | ∞ | 0 | | | |

TABLE 5

Example 2
Based on wavelength of 750 nm

| | |
|---|---|
| f | 20.00 |
| Bf | 3.76 |
| FNo. | 1.22 |
| 2ω (°) | 41.0 |

TABLE 6

Example 2

| Sn | 1 | 2 |
|---|---|---|
| KA | 1.00000000000000E+00 | 1.00000000000000E+00 |
| A3 | 8.32522780670735E−20 | −5.25446879510642E−20 |
| A4 | 1.97139220549306E−04 | 2.75797057035493E−04 |
| A5 | −8.14830060485105E−05 | −9.21863674159501E−05 |
| A6 | −1.78523301754724E−06 | −1.05939544961224E−05 |
| A7 | 5.00093632931518E−06 | 7.62418351125922E−06 |
| A8 | −2.01006326179159E−07 | 2.37030061594975E−07 |
| A9 | −1.62586061859883E−07 | −3.40354434514541E−07 |
| A10 | 8.02842859070395E−09 | −6.32468114388753E−10 |
| A11 | 3.21435926725705E−09 | 8.78723582983194E−09 |
| A12 | −1.25841502630922E−10 | −7.33040191726390E−11 |
| A13 | −3.95114488881172E−11 | −1.31196702412684E−10 |
| A14 | 8.56264838169817E−13 | 1.26756245226071E−12 |
| A15 | 2.84101492191311E−13 | 1.05273629881436E−12 |
| A16 | −1.79822775487613E−15 | −6.59016147259110E−15 |
| A17 | −9.32964843675683E−16 | −3.51745715125292E−15 |

| Sn | 12 | 13 |
|---|---|---|
| KA | 1.00000000000000E+00 | 1.00000000000000E+00 |
| A3 | −2.63661001830297E−19 | 5.47584763621568E−19 |
| A4 | 7.69062485880327E−04 | 5.58824086012230E−04 |
| A5 | −7.18299861513192E−04 | −5.82014482847643E−04 |
| A6 | −3.08191153640856E−04 | −2.29317418771021E−04 |
| A7 | 1.50573726118001E−04 | 1.13286655115504E−04 |
| A8 | 4.39228040392562E−05 | 2.89734819894227E−05 |
| A9 | −1.57941357509228E−05 | −1.25227096386596E−05 |
| A10 | −4.28451185218736E−06 | −2.07231984984635E−06 |
| A11 | 9.71926363897553E−07 | 7.84289375079686E−07 |
| A12 | 2.71578958426889E−07 | 9.25637246388842E−08 |
| A13 | −3.62108448016831E−08 | −2.93262080468858E−08 |
| A14 | −1.04315161236249E−08 | −2.55738498084237E−09 |
| A15 | 7.94286727242019E−10 | 6.47330644407162E−10 |
| A16 | 2.15017706391134E−10 | 3.94270153627569E−11 |
| A17 | −9.21696448553944E−12 | −7.76955539347662E−12 |
| A18 | −1.79494919263469E−12 | −2.54988418907241E−13 |
| A19 | 4.14669863561268E−14 | 3.90069174879803E−14 |

Example 3

Figure 6:
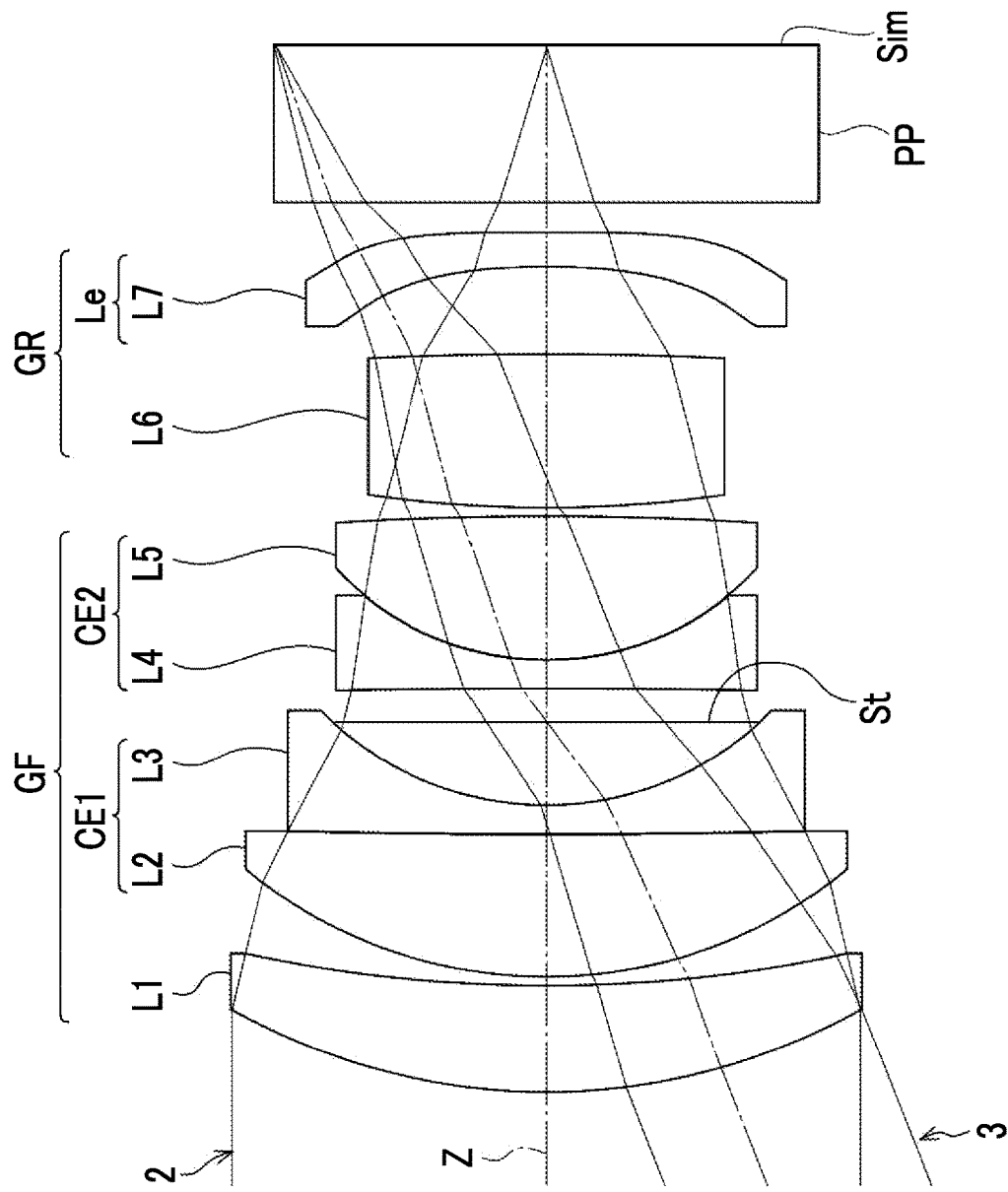
FIG. 6 is a cross-sectional view showing a configuration and rays of an imaging lens according to Example 3 of the present disclosure.
Figure 7:
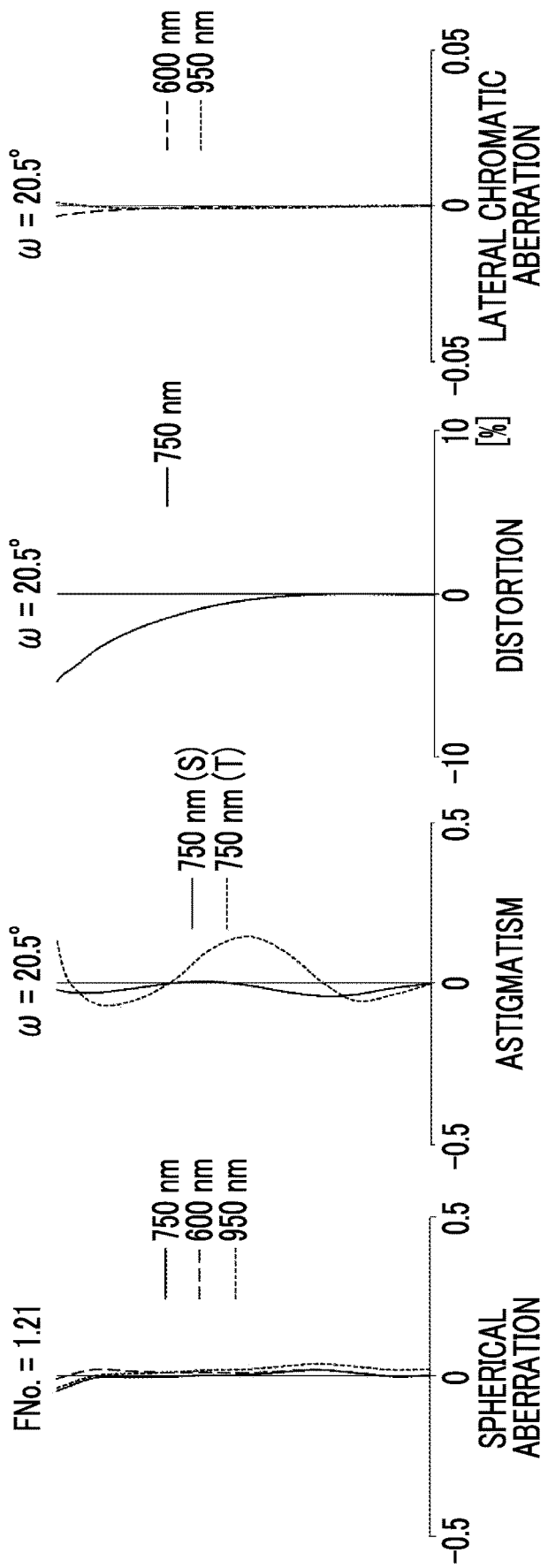
FIG. 7 is a diagram showing aberrations of the imaging lens of Example 3 of the present disclosure.

FIG. 6 is a cross-sectional view showing a configuration and rays of the imaging lens of Example 3. The imaging lens of Example 3 has the same configuration as the outline of the imaging lens of Example 1. Regarding the imaging lens of Example 3, Table 7 shows basic lens data, Table 8 shows specification, and Table 9 shows aspheric surface coefficients thereof, and FIG. 7 shows aberration diagrams.

TABLE 7

Example 3
Based on wavelength of 750 nm

| Sn | R | D | nA | νA | Material |
|---|---|---|---|---|---|
| *1 | 15.8530 | 2.9604 | 1.70504 | 53.34 | M-LAC8.HOYA |
| *2 | 39.9743 | 0.2367 | | | |
| 3 | 11.9347 | 3.9228 | 1.85830 | 40.15 | TAFD32.HOYA |
| 4 | 278.6576 | 0.8020 | 1.74591 | 25.96 | S-TIH14.OHARA |
| 5 | 7.9457 | 2.2999 | | | |
| 6(St) | ∞ | 0.9238 | | | |
| 7 | −314.3973 | 0.7949 | 1.73995 | 26.96 | S-TIH4.OHARA |
| 8 | 7.3130 | 3.9317 | 1.82340 | 42.16 | S-LAH55VS.OHARA |
| 9 | −83.5921 | 0.2357 | | | |
| 10 | 31.4646 | 4.2352 | 1.89607 | 34.68 | TAFD35.HOYA |
| 11 | −97.4972 | 2.4179 | | | |
| *12 | −17.5007 | 0.9429 | 1.57718 | 58.85 | M-BACD12.HOYA |
| *13 | ∞ | 0.8261 | | | |
| 14 | ∞ | 4.3540 | 1.48317 | 69.78 | N-FK5.SCHOTT |
| 15 | ∞ | 0 | | | |

TABLE 8

Example 3
Based on wavelength of 750 nm

| | |
|---|---|
| f | 20.00 |
| Bf | 3.76 |
| FNo. | 1.21 |
| 2ω (°) | 41.0 |

TABLE 9

Example 3

| Sn | 1 | 2 |
|---|---|---|
| KA | 1.00000000000000E+00 | 1.00000000000000E+00 |
| A3 | 1.43893419236843E−19 | 0.00000000000000E+00 |
| A4 | 2.12849975397550E−04 | 2.97229517094179E−04 |
| A5 | −8.16658492507878E−05 | −9.31943300438688E−05 |
| A6 | −3.54032224209638E−06 | −1.28210385667202E−05 |
| A7 | 5.05467163146083E−06 | 7.69699855292146E−06 |
| A8 | −1.01032273184175E−07 | 3.64238695721818E−07 |
| A9 | −1.66913940701220E−07 | −3.43068562146413E−07 |
| A10 | 4.94688991501111E−09 | −4.77229208803888E−09 |
| A11 | 3.37381163171344E−09 | 8.84783422261677E−09 |
| A12 | −7.33642653973566E−11 | 2.62815966372052E−12 |
| A13 | −4.25516278153349E−11 | −1.32015009338202E−10 |
| A14 | 3.91047816736320E−13 | 5.37311231558959E−13 |
| A15 | 3.13358741737731E−13 | 1.05892387792162E−12 |
| A16 | −1.20149037349901E−16 | −3.72423272796578E−15 |
| A17 | −1.04547295535139E−15 | −3.53756579649085E−15 |

| Sn | 12 | 13 |
|---|---|---|
| KA | 1.00000000000000E+00 | 1.00000000000000E+00 |
| A3 | −9.59394213490075E−20 | −4.10957120338941E−19 |
| A4 | 6.07815592892670E−04 | 3.19318449431464E−04 |
| A5 | −8.42754899346793E−04 | −6.59892094465961E−04 |
| A6 | −2.54703716450056E−04 | −1.70350134470105E−04 |
| A7 | 1.72722869040860E−04 | 1.25221669559106E−04 |
| A8 | 3.44089292748319E−05 | 2.04394894247567E−05 |

TABLE 9-continued

Example 3

| | | |
|---|---|---|
| A9 | −1.82946244825818E−05 | −1.35988060087418E−05 |
| A10 | −3.38715093603022E−06 | −1.38858567448296E−06 |
| A11 | 1.14915180682939E−06 | 8.43780390507313E−07 |
| A12 | 2.23736978044614E−07 | 6.10692171734642E−08 |
| A13 | −4.40938655253001E−08 | −3.13611331240771E−08 |
| A14 | −8.98298907370325E−09 | −1.72448928680133E−09 |
| A15 | 1.00743076038569E−09 | 6.89432817292497E−10 |
| A16 | 1.91837758271799E−10 | 2.76803295000588E−11 |
| A17 | −1.24134358493939E−11 | −8.25331029574929E−12 |
| A18 | −1.64315906944698E−12 | −1.86583637770350E−13 |
| A19 | 6.18344266886340E−14 | 4.13803920367070E−14 |

Example 4

FIG. 8 is a cross-sectional view showing a configuration and rays of the imaging lens of Example 4. The imaging lens of Example 4 has the same configuration as that of the imaging lens of Example 1 except that the rear group GR consists of lenses L6 to L8 and the lens L8 is the most image side lens Le. Regarding the imaging lens of Example 4, Table 10 shows basic lens data, Table 11 shows specification, and Table 12 shows aspheric surface coefficients thereof, and FIG. 9 shows aberration diagrams.

TABLE 10

Example 4
Based on wavelength of 750 nm

| Sn | R | D | nA | vA | Material |
|---|---|---|---|---|---|
| *1 | 15.7450 | 2.7527 | 1.68568 | 52.59 | L-LAL13.OHARA |
| *2 | 37.2858 | 0.2361 | | | |
| 3 | 11.8755 | 4.2553 | 1.87041 | 40.18 | S-LAH58.OHARA |
| 4 | −1304.2244 | 0.7949 | 1.71398 | 27.90 | S-TIH10.OHARA |
| 5 | 7.4551 | 2.1350 | | | |
| 6(St) | ∞ | 0.7113 | | | |
| 7 | 56.3301 | 3.9394 | 1.68919 | 54.93 | S-LAL14.OHARA |
| 8 | −7.3126 | 0.7871 | 1.78771 | 24.87 | S-TIH6.OHARA |
| 9 | −35.6681 | 0.2360 | | | |
| 10 | 57.3547 | 4.2424 | 1.82114 | 36.63 | S-LAH60V.OHARA |
| 11 | −9.4357 | 0.9330 | 1.51154 | 51.83 | S-NSL36.OHARA |
| 12 | ∞ | 1.6989 | | | |
| *13 | −14.8964 | 0.9443 | 1.67698 | 30.46 | L-TIM28.OHARA |
| *14 | ∞ | 0.8238 | | | |
| 15 | ∞ | 4.3538 | 1.48317 | 69.78 | N-FK5.SCHOTT |
| 16 | ∞ | 0 | | | |

TABLE 11

Example 4
Based on wavelength of 750 nm

| | |
|---|---|
| f | 20.00 |
| Bf | 3.76 |
| FNo. | 1.22 |
| 2ω (°) | 41.0 |

TABLE 12

Example 4

| Sn | 1 | 2 |
|---|---|---|
| KA | 1.00000000000000E+00 | 1.00000000000000E+00 |
| A3 | 4.16575360870351E−20 | −5.25843204612358E−20 |
| A4 | 2.15586997995543E−04 | 2.60664085987783E−04 |
| A5 | −8.47979693725200E−05 | −7.76129986091508E−05 |

TABLE 12-continued

Example 4

| | | |
|---|---|---|
| A6 | −2.04408098456094E−06 | −9.50198118096329E−06 |
| A7 | 5.14039956004650E−06 | 6.00688388362896E−06 |
| A8 | −2.37597509426846E−07 | 2.13384586850373E−07 |
| A9 | −1.63411627819718E−07 | −2.54328653666467E−07 |
| A10 | 1.07610154339477E−08 | −8.63238297065599E−10 |
| A11 | 3.05900060748194E−09 | 6.26446872475457E−09 |
| A12 | −2.02608664140516E−10 | −5.26973164334427E−11 |
| A13 | −3.37186008402855E−11 | −8.97765705768005E−11 |
| A14 | 1.83249612927288E−12 | 9.17702068435380E−13 |
| A15 | 2.02200128359801E−13 | 6.96232344791592E−13 |
| A16 | −6.51144847416152E−15 | −4.67449654601685E−15 |
| A17 | −5.15139236616129E−16 | −2.26560859931611E−15 |

| Sn | 13 | 14 |
|---|---|---|
| KA | 1.00000000000000E+00 | 1.00000000000000E+00 |
| A3 | −1.91898088399615E−19 | 0.00000000000000E+00 |
| A4 | −4.28401300417559E−04 | −3.45981846947207E−05 |
| A5 | −6.07797516736815E−04 | −5.62968503243736E−04 |
| A6 | 3.17255223513808E−05 | −1.40833825964979E−04 |
| A7 | 1.26726824667232E−04 | 1.02882862955472E−04 |
| A8 | −1.79474594203557E−05 | 1.94263312241823E−05 |
| A9 | −1.28569974578654E−05 | −1.09032765545687E−05 |
| A10 | 2.36889037899760E−06 | −1.43011331440501E−06 |
| A11 | 7.55560624752514E−07 | 6.67180144444616E−07 |
| A12 | −1.55846643380015E−07 | 6.44224871570618E−08 |
| A13 | −2.87213244836322E−08 | −2.45798011393520E−08 |
| A14 | 5.55101822373672E−09 | −1.76530659626703E−09 |
| A15 | 6.37865256124817E−10 | 5.36814100834921E−10 |
| A16 | −1.02472762140285E−10 | 2.68108179239411E−11 |
| A17 | −7.68998329317841E−12 | −6.38723762060545E−12 |
| A18 | 7.76636775073254E−13 | −1.70981652419461E−13 |
| A19 | 3.75198430444269E−14 | 3.17996774081693E−14 |

Table 13 shows values corresponding to Conditional Expressions (1) to (4) of the imaging lenses of Examples 1 to 4.

TABLE 13

| Expression Number | | Example 1 | Example 2 | Example 3 | Example 4 |
|---|---|---|---|---|---|
| (1) | f/fCE1 | −0.021 | −0.090 | −0.099 | −0.063 |
| (2) | fe/f | −1.05 | −1.50 | −1.52 | −1.10 |
| (3) | R3/(n2 × f) | 0.315 | 0.321 | 0.321 | 0.317 |
| (4) | Dair/DL | 0.225 | 0.259 | 0.258 | 0.212 |

As can be seen from the above data, the imaging lenses of Examples 1 to 4 are configured to be small in size while having an F number less than 1.4, and realize high optical performance by satisfactorily correcting various aberrations. The imaging lenses of Examples 1 to 4 can be suitably used in the wavelength range of 550 nm to 1000 nm, and particularly suitably in the wavelength range of 600 nm to 950 nm.

Next, an imaging apparatus according to an embodiment of the present disclosure will be described. FIG. 10 is a schematic configuration diagram of an example of the imaging apparatus according to the embodiment of the present disclosure. The imaging apparatus 10 shown in FIG. 10 is an apparatus for a night vision system, and comprises the imaging lens 1 according to the embodiment of the present disclosure, an image intensifier 5, and an eyepiece lens 6. In FIG. 10, the left side is the object side and the right side is the eye side. The imaging lens 1 of FIG. 10 functions as a night vision objective lens. The image intensifier 5 has a function of an optical amplification unit that enhances the optical image formed by the imaging lens 1. The optical image formed by the imaging lens 1 is formed on the eye side surface of the face plate Lp included in the image intensifier 5. Through the action of the image intensifier 5, the luminance of this optical image is intensified, and a higher luminance image is displayed on the eye side surface of the image intensifier 5. The observer observes the displayed higher luminance image through the eyepiece lens 6.

The eyepiece lens 6 mostly has positive distortion. However, using a configuration in which the imaging lens 1 has negative distortion, it becomes easy for the positive and negative distortions to cancel out each other. As a result, it becomes easy for the imaging apparatus 10 to obtain excellent optical performance.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the examples, and different values may be used therefor.

Further, although the aberration diagrams of the above-described examples show the wavelength range of 600 nm to 950 nm, the technique of the present disclosure is not limited to this wavelength range, and may be applied to an imaging lens in which the wavelength range is expanded or contracted.

The imaging apparatus according to the embodiment of the present disclosure is not limited to the above-described apparatus, and the embodiment can be applied to various imaging apparatuses such as a monitoring camera.

What is claimed is:

1. An imaging lens consisting of a front group and a rear group in order from an object side to an image side,
    wherein the front group includes, in order from the object side to the image side, as lenses, only
        a meniscus lens having a positive refractive power and having a convex object side surface,
        a first cemented lens having a convex surface closest to the object side and a concave surface closest to the image side, constituted by cementing a positive lens and a negative lens in order from the object side, and having a negative refractive power as a whole, and
        a second cemented lens having a positive refractive power as a whole,
    wherein the rear group includes a most image side lens which has a negative refractive power and has a concave object side surface at a position closest to the image side, and
    wherein assuming that
        a focal length of the first cemented lens at a wavelength of 750 nm is fCE1, and
        a focal length of the whole system at the wavelength of 750 nm is f,
    Conditional Expression (1) is satisfied, which is represented by $$-0.2 < f/fCE1 < 0 \tag{1}$$

2. The imaging lens according to claim 1, wherein an image side surface of the most image side lens is a convex surface or a flat surface in a paraxial region, and is located closer to the object side than a surface on a radially inner side of an intersection point between a principal ray having an image height of 50% of a maximum image height and the image side surface on a radially outer side of the intersection point.

3. The imaging lens according to claim 1, wherein assuming that a focal length of the most image side lens at the wavelength of 750 nm is fe, Conditional Expression (2) is satisfied, which is represented by $$-2.5 < fe/f < -0.6 \tag{2}$$

4. The imaging lens according to claim 3, wherein Conditional Expression (2-1) is satisfied, which is represented by $$-2 < fe/f < -0.9 \tag{2-1}$$

5. The imaging lens according to claim 1, wherein the rear group includes a positive lens closer to the object side than the most image side lens.

6. The imaging lens according to claim 5, wherein an object side surface of the positive lens of the rear group is a convex surface.

7. The imaging lens according to claim 6,
    wherein the positive lens of the rear group of which the object side surface is a convex surface is disposed closest to the object side in the rear group, and
    wherein a surface closest to the image side in the second cemented lens is a convex surface.

8. The imaging lens according to claim 1, wherein assuming that
    a radius of curvature of an object side surface of the positive lens of the first cemented lens is R3, and
    a refractive index of the positive lens of the first cemented lens at the wavelength of 750 nm is n2,
    Conditional Expression (3-1) is satisfied, which is represented by $$0.1 < R3/(n2 \times f) < 0.5 \tag{3}$$

9. The imaging lens according to claim 8, wherein Conditional Expression (3-1) is satisfied, which is represented by $$0.25 < R3/(n2 \times f) < 0.4 \tag{3-1}$$

10. The imaging lens according to claim 1, wherein assuming that
    a sum of all air distances on an optical axis of the imaging lens is Dair, and
    a distance on the optical axis from a lens surface closest to the object side in the front group to a lens surface closest to the image side in the rear group is DL,
    Conditional Expression (4) is satisfied, which is represented by $$0.1 < Dair/DL < 0.4 \tag{4}$$

11. The imaging lens according to claim 10, wherein Conditional Expression (4-1) is satisfied, which is represented by $$0.18 < Dair/DL < 0.3 \tag{4-1}$$

12. The imaging lens according to claim 1, wherein the number of lenses included in the imaging lens is 7 or 8.

13. The imaging lens according to claim 1, wherein Conditional Expression (1-1) is satisfied, which is represented by $$-0.12 < f/fCE1 < 0 \tag{1-1}$$

14. An imaging apparatus comprising the imaging lens according to claim 1.

* * * * *